United States Patent [19]

Segawa

[11] Patent Number: 4,905,287

[45] Date of Patent: Feb. 27, 1990

[54] PATTERN RECOGNITION SYSTEM

[75] Inventor: Hideo Segawa, Tokyo, Japan

[73] Assignee: Kabushiki Kaisha Toshiba, Kawasaki, Japan

[21] Appl. No.: 169,054

[22] Filed: Mar. 16, 1988

[30] Foreign Application Priority Data

Mar. 16, 1987 [JP] Japan .................................. 62-60394

[51] Int. Cl.$^4$ ............................................... G10L 5/00
[52] U.S. Cl. ..................................................... 381/43
[58] Field of Search ................................... 381/42, 43

[56] References Cited

PUBLICATIONS

A Speaker Independent Recognition Algorithm for Connected Word Using Word Boundary Hypothesizer; Teruhiko Ukita et al., 1986 IEEE, pp. 1077–1080.

Primary Examiner—Emanuel S. Kemeny
Attorney, Agent, or Firm—Oblon, Spivak, McClelland, Maier & Neustadt

[57] ABSTRACT

Multiple similarities between phoneme feature data extracted from a word input signal and reference pattern data read out from a reference pattern memory are calculated by a similarity calculation section. The multiple similarities are converted by a conversion filter into posterior probabilities using parameter sets which are read out from a filter parameter bank in accordance with the obtained multiple similarities. The posterior probabilities are subjected to matching with data stored in word dictionary by a word matching section, thus discriminating the input word.

6 Claims, 12 Drawing Sheets

| P(S1\|C1) | P(S1\|C2) | ---------- | P(S1\|Cn) |
|---|---|---|---|
| P(S2\|C1) | P(S2\|C2) | ---------- | P(S2\|Cn) |
| ⋮ | ⋮ | | ⋮ |
| P(Sn\|C1) | | ---------- | P(Sn\|Cn) |

FIG. 3

| $\alpha_{11}, \beta_{11}$ | $\alpha_{12}, \beta_{12}$ | ---------- | $\alpha_{1n}, \beta_{1n}$ |
|---|---|---|---|
| $\alpha_{21}, \beta_{21}$ | $\alpha_{22}, \beta_{22}$ | ---------- | $\alpha_{2n}, \beta_{2n}$ |
| ⋮ | ⋮ | | ⋮ |
| $\alpha_{n1}, \beta_{n1}$ | $\alpha_{n2}, \beta_{n2}$ | ---------- | $\alpha_{nn}, \beta_{nn}$ |

```
RECOGNITION RESULT
                   SIMILARITY
      KI · SHI ?    1.35

I · CHI  ?    1.35
```

PATTERN RECOGNITION SYSTEM

BACKGROUND OF THE INVENTION

1. Field of the Invention

The present invention relates to a pattern recognition system for calculating a similarity (or distance) between an input pattern and a reference pattern in speech recognition or character recognition, and converting the similarity into a posterior probability to improve recognition precision.

2. Description of the Related Art

A pattern recognition method using a multiple similarity method is known when a character or speech input is to be recognized. However, a multiple similarity is a kind of a scale of similarity represented by an angle between a partial space defined by a standard pattern and a space defined by a feature vector of an input pattern, and its weight of the scale is quite different for each category of a standard pattern. Therefore, in order to improve recognition ratio, another method is proposed. In this method, the multiple similarity is converted into a posterior probability, and the posterior probability is used as an evaluation value of the similarity (Japanese Patent Disclosure (Kokai) No. 59-219799 published on Dec. 11, 1984).

Assuming that a calculated multiple similarity is Si, conditional probability $P(C_i|S_i)$ of similarity Si belonging to a certain category Ci is a posterior probability to be calculated. In order to calculate the probability distribution, probabilities of all similarities obtained between 0 and 1 (i.e., [0,1]) belonging to each category must be calculated, and it is hard to realize in a practical application. Thus, the conditional probability is developed using the Bayes' theorem as follows:

$$P(C_i | S_i) = \frac{P(S_i | C_i) P(C_i)}{P(S_i)} = \frac{P(S_i | C_i) P(C_i)}{\sum_j P(S_i | C_j) P(C_j)} \quad (1)$$

where $P(C_i)/P(C_j)$ is a constant determined by the number of categories because each probability $P(C_i)$ or $P(C_j)$ indicates a probability that an input category is category ci or Cj. Therefore, if $P(S_i|C_i)$ and $$\sum_j P(S_i | C_j)$$

are calculated, posterior probability $P(C_i|S_i)$ can be calculated.

$P(S_i|C_i)$ is a probability of multiple similarity Si obtained when data belonging to category Ci is recognized using a dictionary of category Ci.

$P(C_j|S_i)$ is a probability of multiple similarity Si obtained when data belonging to category Cj is recognized using a dictionary of category Ci.

Of these probability distributions, for example, as shown in FIGS. 1A to 1D, the distribution of similarities S1 when they are recognized using the same dictionary of a category (C1) as an input category (C1) is concentrated near 1.0. However, similarities S1 obtained when they are recognized using a dictionary of a category (C1) different from an input category (C2) are distributed at smaller values in a wider range.

Figure 1A:
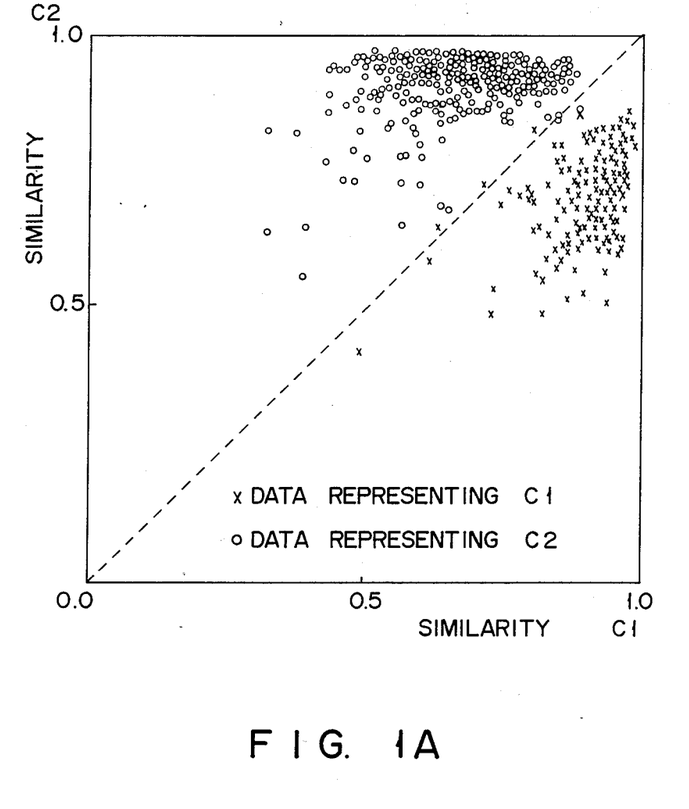
FIGS. 1A to 1D are views showing a probability distribution of similarities.
Figure 1B:
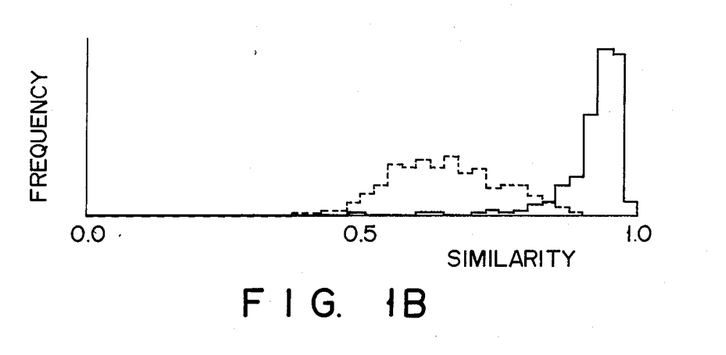
Figure 1C:
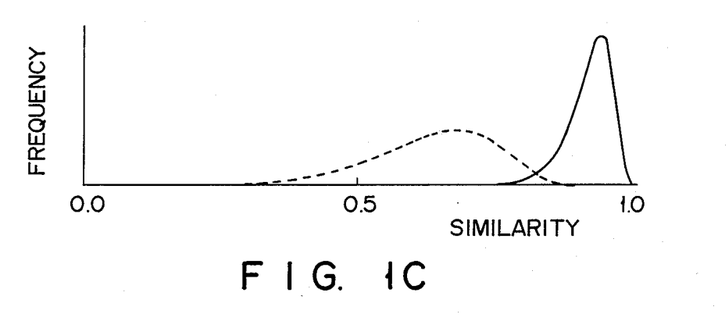
Figure 1D:
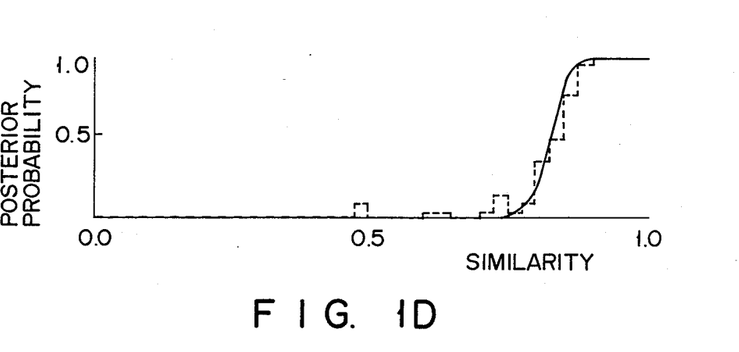

Therefore, when such probability distributions are stored as tables, posterior probability $P(C_i|S_i)$ shown in FIG. 1D can be calculated by equation (1).

However, upon design of such a table, the following problems are posed.

That is, in order to convert a multiple similarity into a posterior probability, the shapes of the above mentioned two probability distributions are important. In this case, the shapes of the posterior probability distributions differ depending on individual categories (e.g., some categories are easily recognized, and others are not easily recognized; some categories are similar to each other, and others are not similar to each other; and so on). However, in order to calculate $P(S_i|C_i)$ and $\Sigma P(S_i|C_j)$ for each category, a large volume of data is necessary, and it becomes impossible to form a table.

Thereofre, in a conventional system, a common table is formed for all the categories at the cost of the recognition ratio, and conversion to a posterior probability is performed. Thus, the recognition ratio is inevitably decreased.

In a conventional pattern recognition system which converts a multiple simplarity into a posterior probability to evaluate a similarity, it is difficult to form a conversion table for obtaining a posterior probability for each category. Therefore, a simple table must be used instead, and hence, the recognition ratio is decreased.

SUMMARY OF THE INVENTION

The present invention has been made in consideration of the above situation and has as its object to provide a pattern recognition system which can form an accurate conversion converting a multiple similarity into a posterior probability for each category, and can therefore improve a recognition ratio.

According to the characteristic feature of the present invention, a posterior probability conversion means for converting a multiple similarity obtained based on a feature vector of an input pattern and a standard pattern for each category into a posterior probability is constituted by the following parameter table and posterior probability conversion filter. More specifically, the parameter table stores a parameter pair $\alpha$ and $\beta$. A parameter $\alpha$ indicates a number of components which are not involved in a subspace spanned by a reference pattern. The other parameter $\beta$ indicates a variance in a direction of non-reference subspace. Both parameters are estimated from multiple similarity values between a reference pattern and training data.

The posterior probability conversion filter calculates a posterior probability based on the multiple similarity calculated by the multiple similarity calculation section, and the parameter sets.

It is experimentally and theoretically demonstrated that probability distribution $P(S_i|C_j)$ of multiple similarity Si obtained when data belonging to a category Cj is recognized using a reference pattern of category Ci can be approximated by a $\Gamma$ distribution regardless of $i=j$ or $i \neq j$. $\alpha_{ij}$ and $\beta_{ij}$ whose properties are mentioned above serve as parameters for determining the shape of the $\Gamma$ distribution, and the probebility distrubution is represented by:

$$P(S_i | C_i) = \frac{S_i^{\alpha_{ij}-1} \exp(-S_i/\beta_{ij})}{\Sigma(\alpha_{ij}) \beta^{\alpha_{ij}}} \quad (2)$$

Training similarity value data of these parameters $\alpha ij$ and $\beta ij$ for all i can be obtained for one training pattern belonging to Cj. In order to calculate effective estimation values of these parameters, only several tens of training data is necessary. For this reason, the paremeter table storing these parameters can be very easily acquired.

During pattern recognition, necessary parameter set $\alpha$ and $\beta$ is read out in accordance with resultant similarity Si, and equation (1) is calculated by the posterior probability conversion filter, thus obtaining a desired posterior probability distribution.

Therefore, according to the present invention, a precise posterior probability conversion table can be formed with a smaller volume of data, and hence, recognition precision can be improved.

DETAILED DESCRIPTION OF THE PREFERRED EMBODIMENTS

Figure 2A:
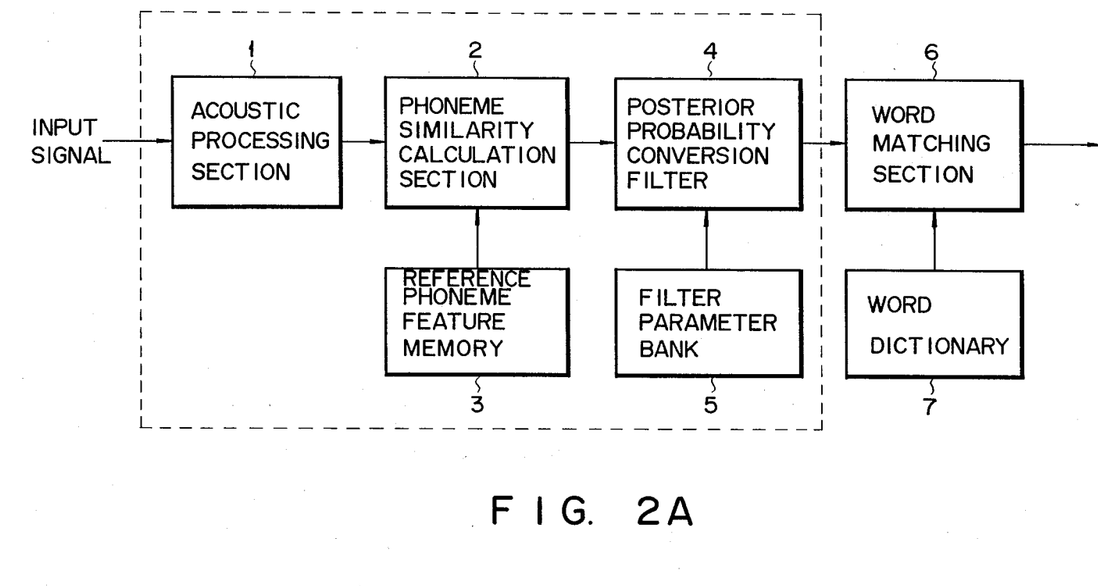
FIG. 2A is a block diagram functionally showing an arrangement according to an embodiment of the present invention.
Figure 2B:
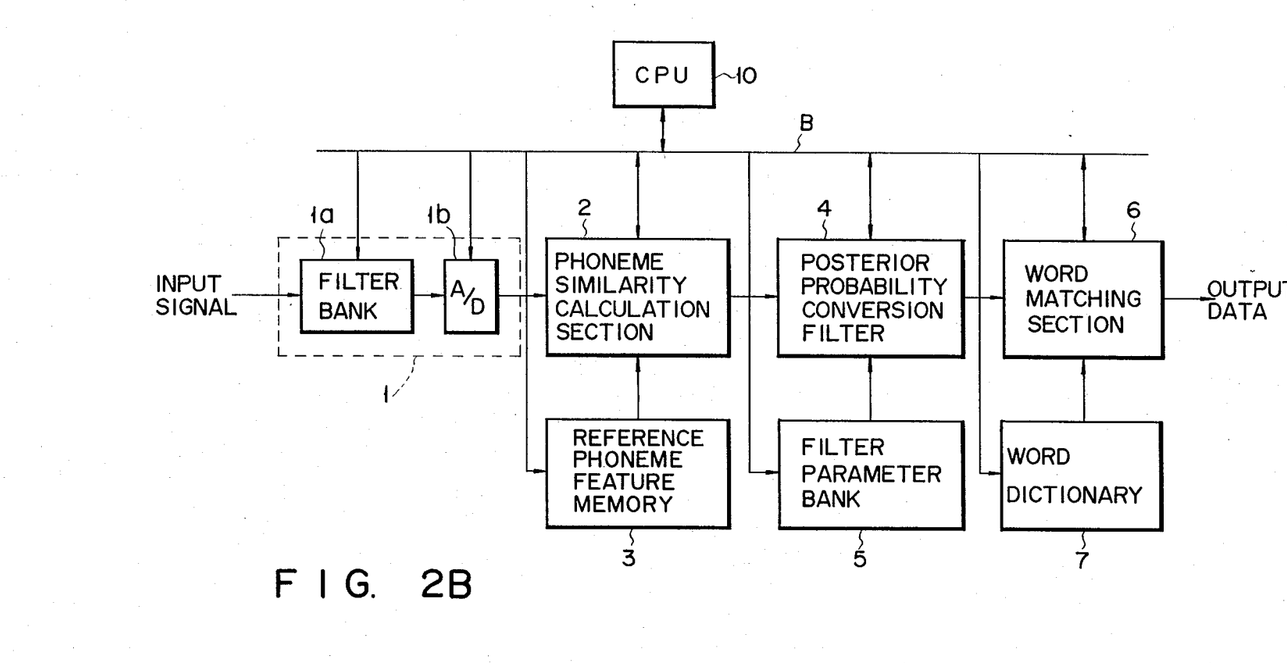
FIG. 2B is a block diagram showing a detailed arrangement of the embodiment shown in FIG. 2A.

FIG. 2A shows functional blocks of an embodiment in which the present invention is applied to a phoneme-based or a syllable-based word recognition system, and FIG. 2B is a block diagram showing an arrangement for realizing the functions shown in FIG. 2A by using a CPU.

More specifically, a speech signal is input to acoustic processing section 1 through a speech input means such as a microphone (not shown) at predetermined time intervals (frames). As shown in FIGS. 2B, acoustic processing section 1 comprises filter band 1a for dividing a speech frequency range into 8 to 30 ranges and analyzing frequency spectra of these renges, and A/D converter 1b. Thus, section 1 extracts feature pattern data of a speech input.

The obtained feature pattern data is supplied to phoneme similarity calculation section 2. Section 2 calculates multiple similarity Si between reference pattern data stored in multiple similarity (reference) phoneme feature memory 3 and the input feature pattern data. Obtained multiple similarity Si is supplied to posterior probability conversion filter 4. Filter 4 converts multiple similarity Si into posterior probability $P(Ci|Si)$ using parameters $\alpha ij$ and $\beta ij$ stored in filter parameter bank (to be referred to as FPB hereinafter) 5. Filter 4 constitutes a posterior probability conversion means together with FPB 5 serving as a parameter table.

Figure 3:
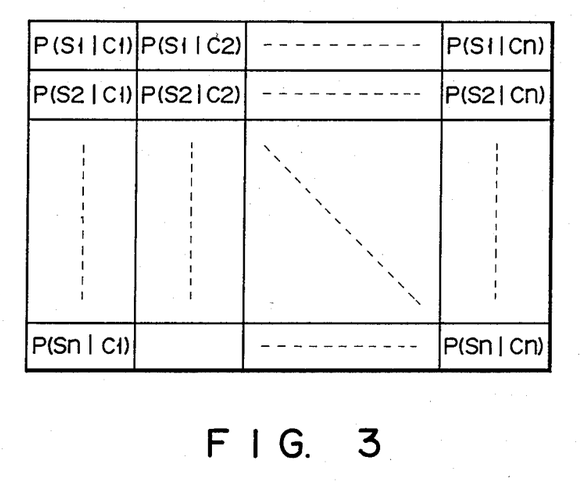
FIGS. 3 and 4 are views showing contents of a filter parameter bank.
Figure 4:
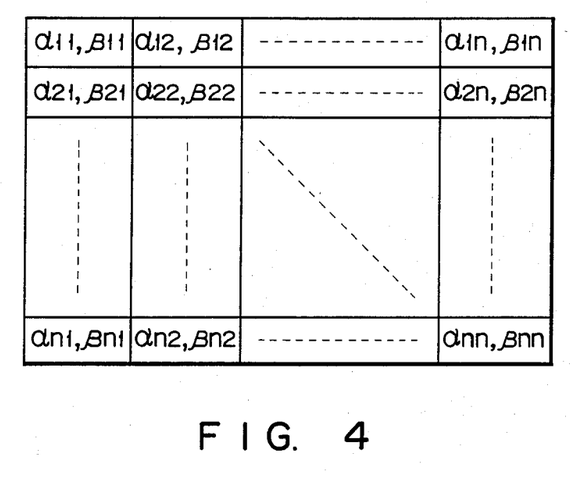

Word matching section 6 collates a posterior probability sequence output from filter 4 with a word dictionary stored in word dictionary 7 in accordance with the Viterbi algorithm in the Hidden Markov Model or DP matching to perform word recognition processing. With the above arrangement, FPB 5 can only store probabilities $P(Si|Cj)$ (i=1 to n, j=1 to n), as shown in FIG. 3. With these parameters, posterior probability $P(Ci|Si)$ can be calculated by equation (1). However, according to the present invention, parameter data $\alpha ij$ and $\beta ij$ for uniquely determining these probabilities are stored in FPB 5 in place of the above-mentioned probabilities, as shown in FIG. 4. The registration procedures of the parameter data will be explained below. In this case, probability $P(Si|Cj)$ (i≠j) can be approximiated by the distribution in the same manner as in posterior probability $P(Si|Ci)$, and can be stored by the identical procedures.

Assuming that a sample value x is given, its probability density function P(x) is represented by:

$$P(x) = \frac{(x - \gamma)^{\alpha-1}}{\beta^{\alpha} \cdot \Gamma(\alpha)} \exp\{-(x - \gamma)/\beta\} \quad (3)$$

Function P(x) Is determined by three variables $\alpha, \beta$, and $\gamma$. As is known, parameters can be estimated by a maximum likelihood estimation method or a moment estimation method. However, in this case, for the convenience in calculation, parameters $\alpha$, $\beta$ are respectively partially diferentiated to obtain $\alpha$ and $\beta$ satisfying the following equations:

$$\sum_{k=1}^{N} (xk - \gamma) - N\alpha\beta = 0 \quad (4)$$

$$-\sum_{k=1}^{N} (xk - \gamma)^{-1} - N\{\beta(\alpha - 1)\} = 0 \quad (5)$$

Since $\gamma = 0$, then the above equations can be obtained by solving the following simultaneous equations (where N is the number of samples)

$$\frac{1}{N} \sum_{k=1}^{N} x\,k = \alpha\beta \quad (6)$$

$$\frac{1}{N} \sum_{k=1}^{N} \frac{1}{x\,k} = \beta(\alpha - 1) \quad (7)$$

Therefore, when several tens of feature pattern data are sampled in advance for each category Ci during learning, parameters $\alpha ij$ and $\beta ij$ can be calculated by the above equations, and can be registered or prestored.

Assuming that a pattern vector of feature parameter data at a given time output from acoustic processing section 1 is given as xk (k=1, 2, ... N), multiple similarity Si between standard pattern data of category Ci in multiple similarity phoneme dictionary 3 and the feature pattern data is calculated by:

$$Si = \frac{\sum_{m=1}^{Mi} (x, \phi im)^2}{||x||^2} \quad (8)$$

where $\phi_{im}$ indicates a proper vector having an Mi-th largest proper value of a correlative matrix constituted by a learning pattern of an i-th phoneme category. Mi indicates that vectors are used up to an (Mi)th proper vector.

Figure 5:
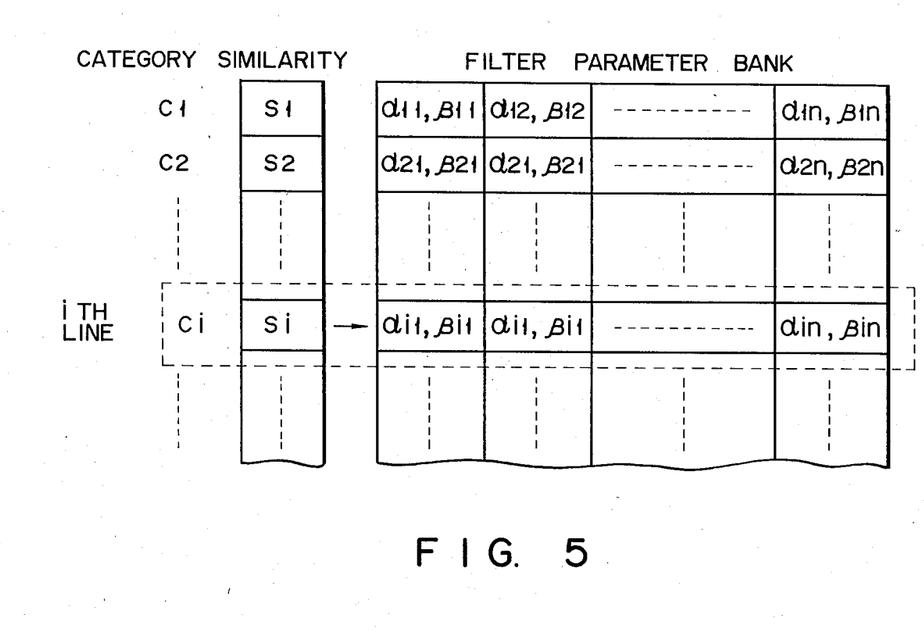
FIG. 5 is a view showing procedures of fetching parameter sets of a posterior probability.

Similarity Si (i=1 to n) for each category is calculated by the multiple similarity calculation, as shown in FIG. 5. The operations of the respective blocks of FIG. 2B are performed by CPU 10 through bus B.

Figure 6A:
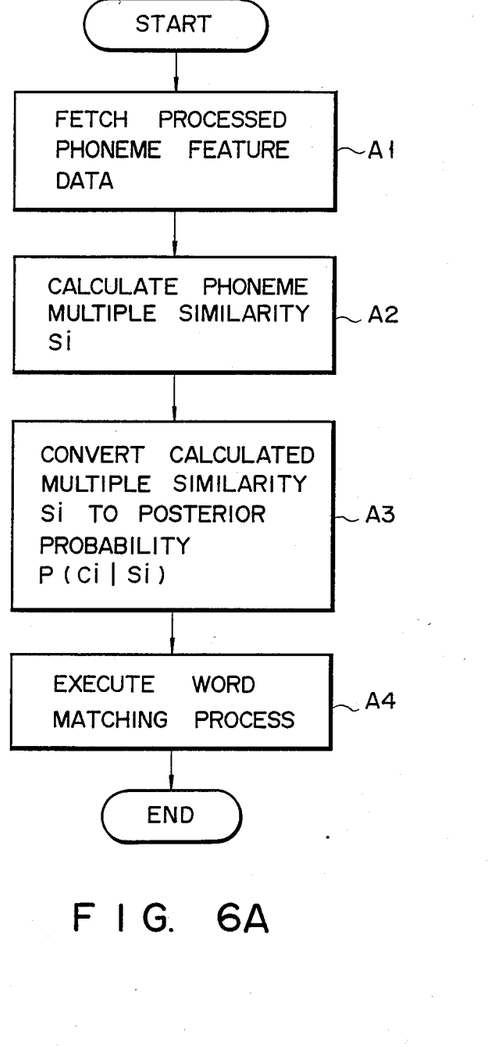
FIGS. 6A and 6B are flow charts for explaining the operation of the embodiment shown in FIGS. 2A and 2B.

The operation of CPU 10 shown in FIG. 2B will be described with reference to the flow chart shown in FIG. 6A. In step A1, phoneme feature data obtained from acoustic processing section 1 is fetched by phoneme similarity calculation section 2.

The flow advances to step A2, and for the fetched phoneme feature data, phoneme feature reference memory 3 is accessed to read out standard pattern data of a pnoneme feature for each category. Then, multiple similarities Si between the input phoneme feature data and the standard pattern data are sequentially calculated. Resultant multiple similarities Si are sequetnnially sent to posterior probability conversion filter 4.

Filter 4 converts input multiple similarities Si into posterior probabilities P(Ci|Si), in step A3. For this purpose, CPU 10 accesses filter parameter bank 5 in accordance with input similarity Si, sequentially reads out parameters $\alpha ij$ and $\beta ij$ stored therein, and supplies the readout parameters to filter 4. The operation of conversion filter 4 will be described later with reference to the flow chart shown in FIG. 6B.

The sequence of posterior probabilities P(Ci|Si) obtained by filter 4 is supplied to word matching section 6. In step A4, matching between the probabilities and data stored in word dictionary 7 is performed. The Viterbi algorithm by the Hidden Markov Model is executed by CPU 10, and a word recognition output is obtained as output data.

Figure 6B:
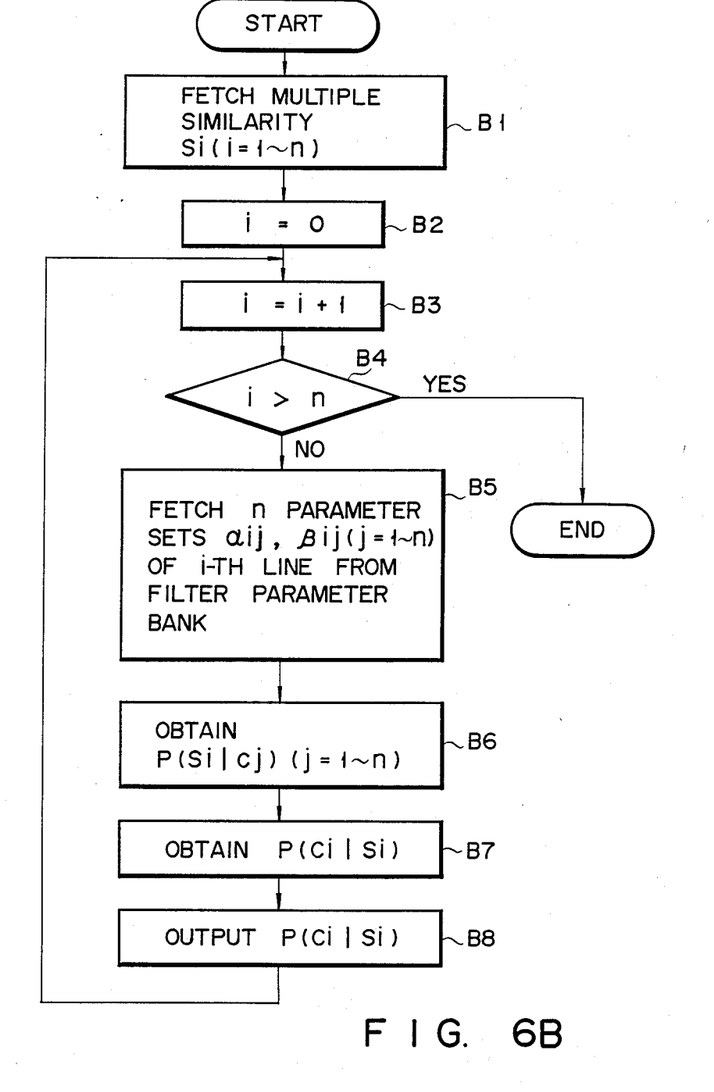

The conversion processing to posterior probability P(Si|Ci) by filter 4 is executed by CPU 10 the procedures shown in FIG. 6B.

More specifically, when multiple smilarity Si is input to filter 4 in step B1, i is incremented from 1 to n by one in steps B2, B3, B4, and B5, and the following processing is executed. As shown in FIG. 5, n parameter sets $\alpha ij$ and $\beta ij$ (j=1 to n) are fetched from FPB 5 in step B5. Next, in step B6, n parameter sets $\alpha ij$ and $\beta ij$ and n similarities Si (i=1 to n) are substituted in equation (2) to obtain n probabilities P(Si|Cj) (j=1 to n). In step B7, these n probabilities P(Si|Cj) are substituted in equation (1) to obtain posterior probabilities P(Ci|Si). Obtained posterior probabilities P(Ci|Si) are supplied to word matching 6 in step B8.

A description will be made with reference to FIGS. 7 to 11 while comparing results of conversion speech recognition using a similarity and speech recognition using a posterior probability according to the present invention.

Figure 7:
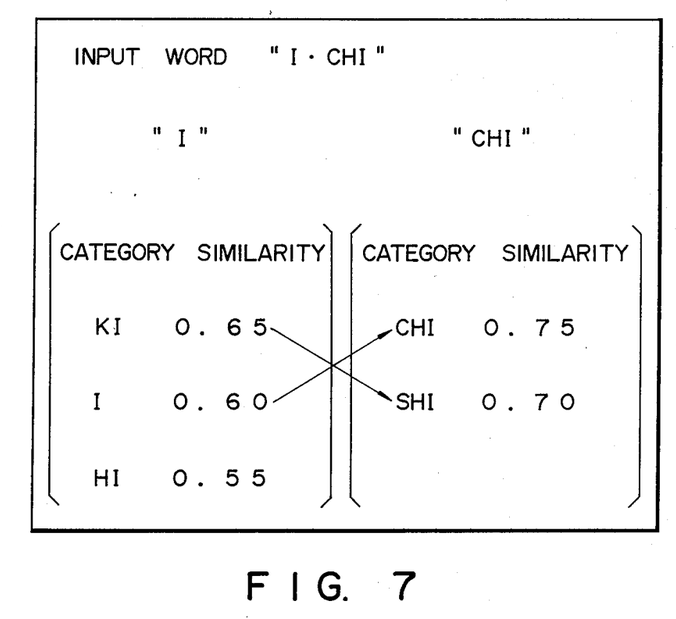
FIGS. 7 and 8 are views showing a recognition result of a speech input in accordance with a similarity.

FIG. 7 shows a conventional case wherein a similarity is used. When "i·chi" is input as a word speech input, 0.65, 0.60, and 0.55 are respectively obtained as multiple similarities for three categories "ki", "i", and "hi" associated with first syllable "i".

Similarities 0.75 and 0.70 are obtained for two categories "chi" and "shi" associated with second syllable "chi".

Figure 8:
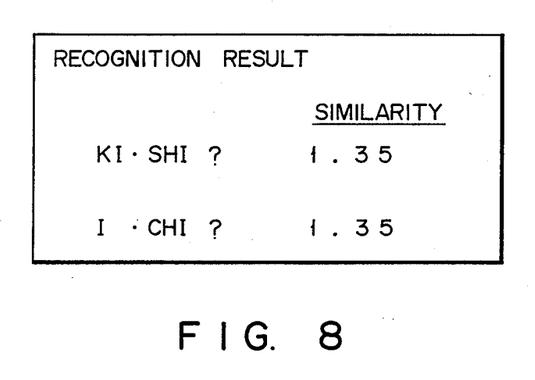

Therefore, upon recognition of a word, a sum of similarities for a combination of "ki-shi" is 0.65+0.70=1.35, and a sum of similarities for a combination of "i·chi" is 0.60+0.75=1.35, as shown in FIG. 8. Therefore, the similarities of "ki-shi" and "i·chi" are the same, and it cannot be discriminated which result is correct.

Figure 9:
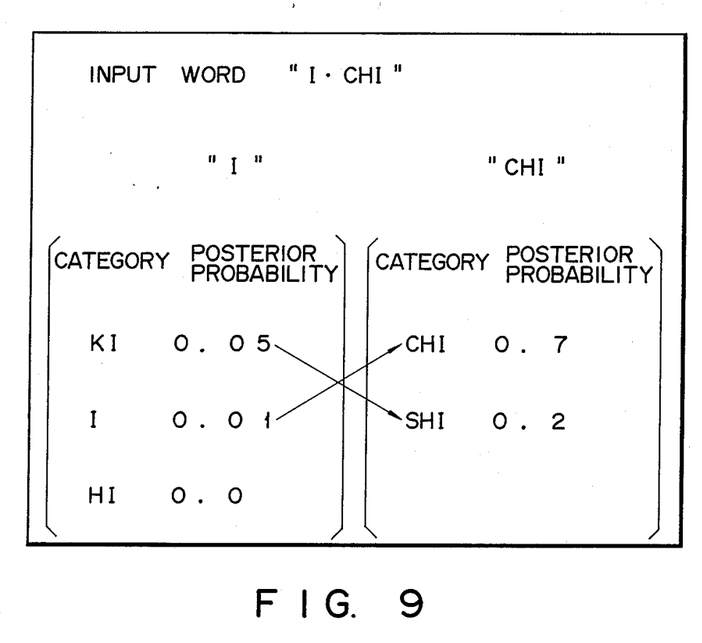
FIGS. 9 and 11 are views showing a recognition result of a speech input in accordance with a posterior probability.
Figure 10:
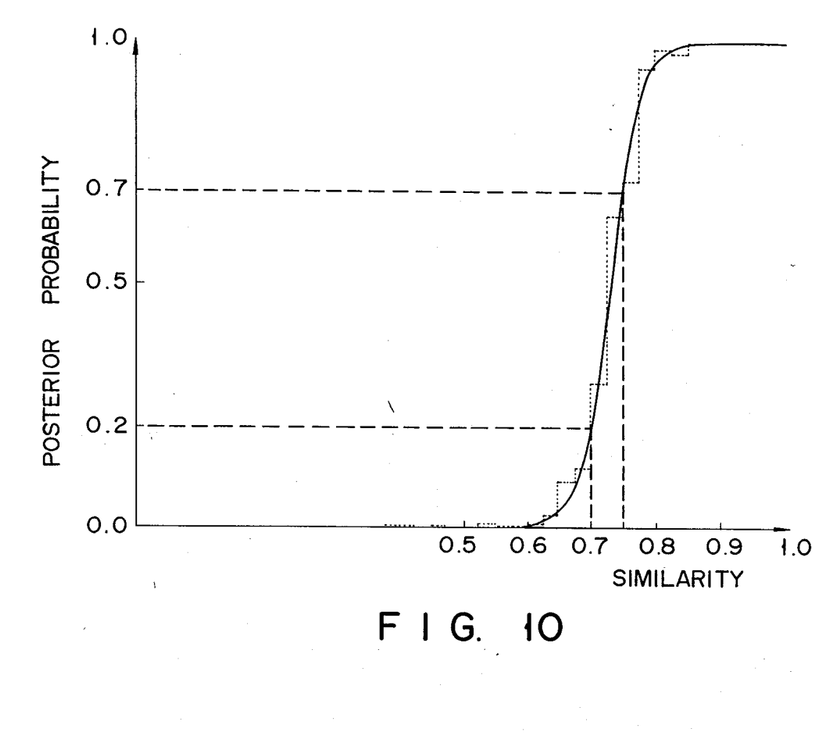
FIG. 10 shows a similarity-posterior probability conversion table.

In contrast to this, a posterior probability of the same speech input "i·chi" according to the present invention is calculated, as shown in FIG. 9. More specifically, posterior probabilities of categories "ki", "i", and "hi" associated with first syllable "i" are calculated from their multiple similarities 0.65, 0.60, and 0.55, and respectively yield 0.05, 0.01, and 0.0.

One parameter $\alpha$ of the parameter pair may be alternatively explained as a number of components which are not involved in a subspace spanned by a reference pattern in the specification. This parameter $\alpha$ can be explained intuitively that it is a mean value of similarities which have values of 0 to 1.

The other parameter $\beta$ of the parameter pair indicates a variance in a direction of non-reference subspace. In an intuitive manner, it can be explained that the parameter $\beta$ is a degree of scattering or dispersion of the similarities.

The pairs of the parameters ($\alpha$ and $\beta$) are stored in the conversion table and used to determine the first posterior probability P(Si/Ci) which is then used to calculate the second posterior probability P(Ci/Si) by using Bayes' theorem.

Figure 11:
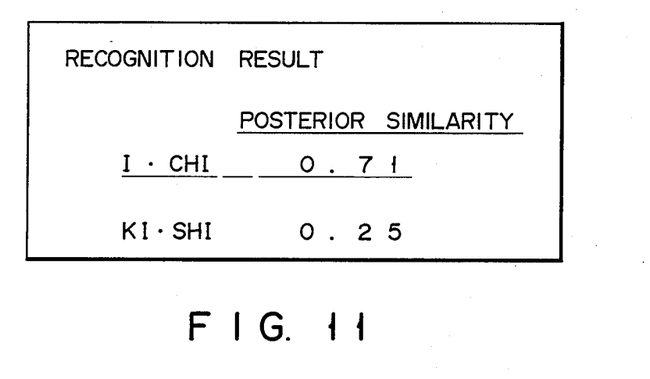

Posterior probabilities of categories "chi" and "shi" are calculated from the their multiple similarities 0.75 and 0.70 (see the conversion table shown in FIG. 10), thus yielding 0.7 and 0.2. As a result, as shown in FIG. 11, "i·chi" and "ki·shi" which cannot be distinguished by the recognition using similarities shown in FIG. 8 can be distinguished as 0.71 and 0.25 by the posterior probabilities, and "i·chi" can be obtained as a correct recognition result.

According to this embodiment, filter parameter bank 5 can be formed by a smaller number of samples, and posterior probabilities can be precisely obtained. Thus, the pattern recognition percentage can be greatly improved.

Figure 12:
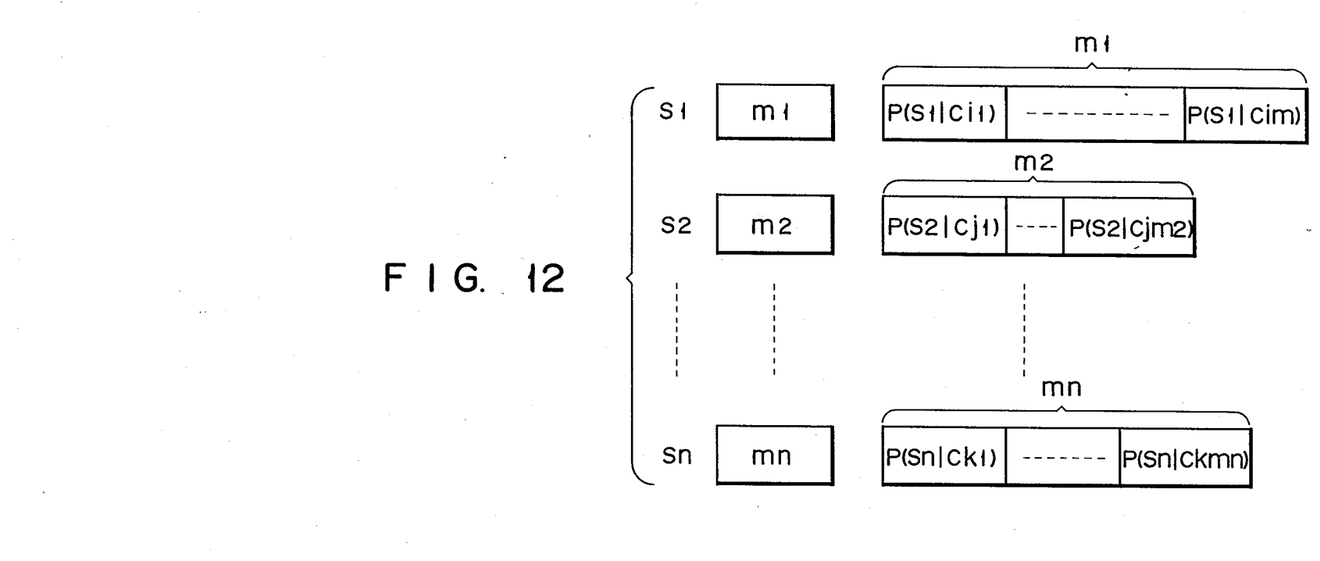
FIG. 12 is a view showing a filter parameter bank according to another embodiment of the present invention.

The present invention is not limited to the above embodiment. For example, in the above embodiment, $n^2$ parameter sets are prepared for PFB 5. In practice, however, some category groups which tend to be erroneously recognized can be specified. Thus, parameter sets which tend to be erroneously recognized may be prestored to form an FPB shown in FIG. 12. In practical applications, since multiple similarities have superior identification properties, multiple similarities Si rarely yield large values at the same time for a large number of categories. For this reason, the following calculation is made in equation (1):

$$\sum_{j=1}^{N} P(Si \mid Cj) \qquad (9)$$

However, when the value Si is sufficiently large almost all terms of this relation becomes 0. Therefore, approximation can be satisfactorily made by:

$$\sum_{j=1}^{n} P(Si \mid Cj) \approx \sum_{k=1}^{mj} P(Si \mid Cjk) \qquad (10)$$

With the above arrangement, the FPB can be rendered compact while maintaining its high performance.